United States Patent [19]
Beer

[11] 3,869,359
[45] Mar. 4, 1975

[54] METHOD OF MAKING INTIMATELY ADMIXED METAL OXIDES

[75] Inventor: Henri Bernard Beer, Heide-Kalmthout, Belgium

[73] Assignee: A.G. fur Oxydenchemie, Vaduz, Liechtenstein

[22] Filed: June 25, 1973

[21] Appl. No.: 373,296

[52] U.S. Cl. .................................................. 204/96
[51] Int. Cl. ............................................ C01b 13/14
[58] Field of Search ...................... 204/96; 423/594

[56] References Cited
UNITED STATES PATENTS

| | | | |
|---|---|---|---|
| 748,609 | 1/1904 | Hunt | 204/96 |
| 1,115,513 | 11/1914 | Dennis | 204/96 |
| 1,361,041 | 12/1920 | Fry | 204/96 |
| 1,402,986 | 1/1922 | Wikle | 204/96 |
| 1,496,607 | 6/1924 | Saunders | 204/96 |
| 3,073,763 | 1/1963 | Beer | 204/96 |
| 3,822,210 | 7/1974 | Iwase et al. | 423/594 |

FOREIGN PATENTS OR APPLICATIONS

| | | | |
|---|---|---|---|
| 1,083,793 | 4/1959 | Germany | 204/96 |

Primary Examiner—R. L. Andrews

[57] ABSTRACT

Intimately admixed metal oxides are produced electrolytically. One component metal oxide is formed from the metal of an anode and at least one other from the metal of a metal compound added to the electrolyte, said compound being poorly soluble in the electrolyte.

23 Claims, No Drawings

METHOD OF MAKING INTIMATELY ADMIXED METAL OXIDES

The invention relates to a continuous method of producing intimately admixed metal oxides.

These mixtures of metal oxides are used for the manufacture of ferrites, paints, anti-fouling paints, enamels, etc.

Known processes are:

a. Mixing the various oxides (in wet or dry condition) for a long time, for example, by ball milling. Thereafter the oxides are pre-sintered, the pre-sintered mass of clinkers is reground, and then used for the desired purpose, for example, pressed into the desired shape and sintered to ferrites. This method is expensive, time-consuming, and by no means produces ideal mixing. It is virtually impossible to produce mixtures of small particle size by means of this prior method. In addition, it is difficult to make highly pure mixtures in this manner, because grinding introduces undesirable contaminations.

b. Chemical co-precipitation.

In this process, salts of the metals whose oxides are desired are dissolved in the correct molecular ratio. By means of a base, such as potassium hydroxide or ammonium hydroxide, these salts are then co-precipitated to form hydroxides, washed out, and then heated in a furnace at a suitable temperature and in the presence of air, which may produce the necessary oxidation. This method can produce the desired result, but is too expensive for it to be carried out in practice, for one thing because the washing treatment is a time-consuming matter.

c. Salts of the metals whose oxides are desired, namely salts which are dissociated at a low temperature, are admixed in the correct molar ratio, and heated to produce a mixture of the oxides of the metals. Examples of such salts are: oxalates, tartrates, acetates.

One drawback of this process is that the oxides are not uniformly admixed, while the individual particles are of widely varying size. This can be improved by subsequent treatments, such as re-crystallization, reduction and re-oxidation, but this renders the process expensive. Furthermore, the cost price of the raw materials, such as, for example, the oxalates, is high.

d. Electrolytic co-precipitation. In this process, the metals whose oxides are desired are connected as anodes in an electrolytic cell, filled with, for example, an aqueous solution of potassium chloride, which causes the metals to be dissolved as chlorides, and subsequently to be precipitated as hydroxides at the cathode by the potassium hydroxide formed at the latter. These hydroxides are then brought to the desired valency in the cell by means of oxidation. The desired ratio of oxides can be obtained by supplying currents of different amperages to these anodes.

This prior method has many advantages over those described under (a), (b) and (c), but still produces difficulties in practice. One difficulty is that in some cases the metal is not a suitable starting material as it is not resistant to the action of the electrolyte. Examples of such metals are barium, magnesium, manganese and lithium.

Another drawback of this method is that, if for example it is desired to produce a mixture of four different oxides, it is necessary to keep four anodes each continuously at a constant amperage, which is difficult, because the electrolyte itself changes in conductivity, pH, etc. owing to the oxides formed etc.

It is an object of the present invention to prevent these difficulties. It has surprisingly been found that when iron oxide is produced electrolytically, the intermediate, namely, freshly precipitated iron hydroxide, is capable of taking up and co-precipitating a controllable proportion of an oxide of another metal or metals from an insoluble or relatively insoluble compounds of that other metal or metals included or dispersed in the electrolyte. Conditions for this effect are that the solubility of these compounds in the electrolyte at the operating temperature should be less than 8 percent, and preferably between 0,0001 and 5 percent, and that the pH of the electrolyte is not changed thereby and is maintained between about 4 and 10. The preferred pH is 6–6.4.

Examples of these compounds are carbonates, oxides, hydroxides, sulphides and fluorides of the metals referred to.

The above examples are mentioned by way of illustration only, and are not intended to be limitative. If the solubility of these compounds is too low, chelating agents, such as E.D.T.A., or complexing compounds, such as ammonium salts, may be added to the electrolyte. Furthermore, the insoluble compounds may be formed in the electrolyte in situ.

The invention is illustrated in and by the following examples, which again are given by way of explanation only, and are not to be construed as limiting the invention in any way.

EXAMPLE I

In a glass 10 litre vessel containing 8 litre electrolyte consisting of an aqueous solution of 5 percent potassium chloride, two iron electrodes were placed, one of which was connected as an anode and the other as a cathode.

To the electrolyte was added 35 g. barium carbonate, having a solubility in the electrolyte at a temperature of 70°C of 0.006 g per litre.

Four air tubes were placed in the vessel, each having a diameter of 10 mm, and through which air was introduced into the electrolyte at a rate of 10 litre per minute to oxidize the resulting bivalent iron hydroxide.

Before electrical current was supplied, the electrolyte was aerated, which resulted in high agitation in the vessel, and caused the possible quantity of barium carbonate to be dissolved and the non-dissolved proportion to be kept in movement in the electrolyte in finely divided form. As a result the original pH of the electrolyte, which was 7, increased to 8–8.2. Subsequently, a current of 15 amp. was supplied to the anode, the latter having a surface area of 1.5 dm².

It may be calculated that each ampere supplied results in 1 g of iron being dissolved, from which 1.33 g $Fe_2O_3$ is formed.

The purpose of this example is to prepare a barium ferrite consisting of 85.4 percent $Fe_2O_3$ and 14.6 percent BaO.

After 8 hours the required amount of $Fe_2O_3$ had formed and the reaction was discontinued. After the current had been switched off, the electrolyte was aerated for another 10 minutes to complete the oxidation. Subsequently the liquid with the oxides formed was boiled for 15 minutes, whereafter the oxides were collected on a Büchner filter and washed with clean water to remove any chloride or other undesirable compounds. Subsequently the washed oxides were dried at a temperature between about 100° and about 300°C.

These oxides were strongly magnetic and exhibited a relatively high permanent magnetism, which indicated that they already had the ferrite structure.

Next the dried oxides were placed in a crucible in a furnace and heated at 800°–1,100°C. This powder turned out to be highly magnetic, and very suitable for incorporation into magnetic rods, rings etc.

In a second test, the powder was compacted by means of a binder and subsequently heated in a furnace at 950°C. The resulting mixture of oxides proved to be highly magnetic, and when magnetized under proper conditions to be an excellent permanent magnet.

Analysis showed that the iron oxide and barium oxide were present in practically the desired ratio and form.

EXAMPLE II

In a vessel was introduced an aqueous electrolyte consisting of 2.5 percent KCl and 2.5 percent $BaCl_2$ solution at a temperature of 70°C. The vessel was equipped with stirrers for moving the liquid.

An anode was installed consisting of iron, on opposite sides of which two perforated iron sheets were placed as cathodes. The surface area of the anode was 16 $dm^2$. To the anode a current was supplied of 180 amp.

In the same vessel two other electrode systems were installed, each consisting of one anode of platinum coated titanium mesh and one cathode of perforated iron, to which a total current was supplied of 50–60 amp. These two electrode systems are productive of potassium hypochlorite, when served as an oxidant.

During the electrolysis, 60 g $BaCo_3$ was added per hour, which had first been ball-milled in wet condition. The pH was maintained between 6.0 and 6.4, e.g., by adding HCl.

After 8 hours, the supply of current to the dissolving iron anode was discontinued, while the formation of oxidant was allowed to continue for one additional hour. Thereafter the oxides formed were collected on a Büchner filter and washed to remove chlorides, whereafter the moist powder was heated at 1,000°–1,100°C. Thereafter these oxides were highly magnetic. It is desirable for the oxides to have a moisture content of between ..01 and 5 percent before being heated at 1,000°C.

EXAMPLE III

A 10 litre plastic container was filled with an electrolyte consisting of a 5 percent aqueous sodium chloride solution.

In it, 3 electrode systems as described in Example II were installed.

To this bath was added a mixture of 35 g zinc carbonate and 39.8 g manganese carbonate. These two carbonates had previously been ball-milled in wet condition for about 15 minutes.

The electrolytic cell was additionally equipped with air tubes, through which air was introduced at a rate of 20 litre per minute. The pH increased to 8. Thereafter a current of 20 amp. was supplied to the iron anode, resulting in the formation of 20 × 1.33 g = 26.6 g $Fe_2O_3$ in the vessel per hour.

In order to produce the correct ratio with the available zinc and manganese compounds, about 2 × 27 g $Fe_2O_3$ had to be produced. Therefore the reaction was discontinued after about 2 hours. The mixture was then allowed to stand in the vessel for 3 days for aging the oxides formed. Thereafter the mixture was in known manner filtered in a centrifuge and washed or magnetically separated from the electrolyte.

To avoid further oxidation, the moist cake thus formed was washed with acetone until the cake contained less than 0.5 percent water. Subsequently the cake was dried at 50°C to remove the acetone present, and then heated to 250°C. The resulting powder was then already a good soft ferrite, and its properties were improved when it was heated at 800°C. The product could be sintered at a temperature as low as 900°C.

Analysis showed the product to consist of 25 percent by weight of manganese oxide, 22.5 percent by weight of zinc oxide and 52.5 percent by weight of iron oxide, calculated as $Fe_2O_3$.

EXAMPLE IV

The process of Example III was repeated, but instead of zinc carbonate and manganese carbonate, copper carbonate was added to the bath.

After completion of the reaction, a mixture of iron oxide and copper oxide had formed, which can produce an excellent anti-fouling paint for ships and also had magnetic properties.

Naturally the dissolving anode, which is in the preceding examples consisted of iron, may be replaced by other dissolving metals, such as copper, nickel, zinc, lead, cobalt etc. The cathodes may consist of any suitable material, for example, of iron, nickel, mercury treated iron, platinum, platinum plated titanium and may be solid, perforated or porous. It is also possible to supply an oxidizing gas through it. The electrolytes which in the preceding examples essentially consist of chlorides, may be replaced by other halides, as iodides and bromides or instead it is in some cases possible to use nitrates, sulphates, acetates, oxalates etc.

EXAMPLE V

In a 5 percent aqueous $NH_4Cl$ solution, two electrodes as described in Example I were installed. They each had a surface area of 1.5 $cm^2$. A current of 20 amp. was supplied. The temperature kept at 10°C by cooling. A central stirrer was provided. On opposite sides of the stirrer and the main electrode system, two electrode systems consisting of platinum coated titanium or other coated valve metals were installed, to which a current of 6.5 amp. was supplied.

7 g $BaCO_3$, ball-milled in wet condition, was added per hour, which produced a ratio of 85 percent $Fe_2O_3$ +.15 percent BaO in needle crystals.

After the supply of current to the anode had been discontinued, oxidation was allowed to continue with stirring for another hour. During the electrolysis the pH was kept at 6.6 to 8.5 by adding $NH_3$. The product obtained was very suitable for magnetic tapes.

EXAMPLE VI

In an aqueous solution containing 2.5 percent $NH_4Cl$ and 2.5 percent $BaBr_2$, two electrodes as described in Example I were installed. They each had a surface area of 1.5 $dm^2$. A current of 20 amp. was supplied. The temperature was kept at −5°C by extra cooling. A central stirrer was provided. On opposite sides of the stirrer and the main electrode system, two electrode systems consisting of solid platinum-iridium were installed, to which a current of 6.5 amp. was supplied. The pH was kept at 9.5.

7 g $BaCO_3$, ball-milled in wet condition, was added per hour, which produced a ratio of 85 percent $Fe_2O_3$ + 15 percent BaO in needle crystals. The shape of the crystals differed somewhat from those of the mixed oxide of Example V.

After the supply of current to the anode had been discontinued, oxidation was allowed to continue with stirring for another hour and cooling to a temperature of 5°C.

During the electrolysis the pH was 6.4.

EXAMPLE VII

In a 5 percent aqueous sodium nitrate solution, two electrodes as described in Example I were installed. These had a surface area of 1.5 dm² each. A current of 20 amp. was supplied and the temperature was 70°C.

In the center, a stirrer was installed, and on opposite sides thereof two electrode systems of platinum coated titanium as described in Example II, to which a current of 3-3.5 amp. was supplied.

7 g $BaCO_3$, ball-milled in wet condition, was added per hour.

The product was a brown powder, which after filtration was directly heated to 1,000°C in moist condition, which produced a black and magnetic mixed oxide. During the electrolysis a strong permanent magnetic field was applied to the glass vessel which promoted the production of the desired product.

EXAMPLE VIII

In an aqueous solution containing 5 percent KCl, two electrodes as described in Example I were installed. The electrodes had a surface area of 1.5 dm².

A current of 20 amp. was supplied. The temperature was 70°C.

In the center, a stirrer was installed, and on opposite sides thereof two electrode systems of platinum plated titanium as described in Example II, to which a current of 6.5 amp. was supplied.

3.8 g wet-milled strontium carbonate was added per hour.

The resulting powder was black and highly magnetic, and after filtration was directly heated in moist condition at 1,100°C, the product being a black and highly magnetic mixed oxide. During the electrolysis an alternating magnetic field was applied to the electrolysis vessel to prevent the magnetic particles from clinging together.

EXAMPLE IX

In an aqueous solution containing 5 percent sodium nitrate, two electrodes as described in Example I were installed. The electrodes had a surface area of 1.5 dm². A current of 20 amp. was supplied and the temperature was 70°C.

In the center of the vessel a stirrer was installed, and on opposite sides thereof two electrode systems of platinum plated titanium as described in Example II. To these a current of 6.5 amp. was supplied.

9.4 g wet-milled lead hydroxide carbonate was added per hour. The product of the electrolysis as a greenish powder, which after filtration and heating in moist condition at 1,000°C became black and highly magnetic.

EXAMPLE X

In a vessel containing an aqueous 5 percent KCl solution at a temperature of 50°C, a nickel anode and an amalgamated iron cathode were installed, to which a current of 20 amp. was supplied.

In the center a stirrer was installed.

In the same vessel two electrode systems of platinum plated titanium and two perforated iron cathodes, as described in Example II were installed, to which a total current of 5.5 amp. was supplied.

5 g wet-milled $BaCO_3$ was added per hour.

The resulting mixed oxide, which is very hard, is suitable after washing and annealing for use, for example, on bearing surfaces.

EXAMPLE XI

A vessel filled with an aqueous solution containing 2.5 percent KCl and 2.5 percent NaCl at a temperature of 90°C was equiped with an anode of aluminum and a cathode of oxidized titanium, to which a current of 25 amp. was supplied.

In the center a stirrer was provided and on the sides two electrode systems of platinum coated titanium mesh and two nickel cathodes, as per Example II, were installed, to which a total current of 10 amp. was supplied.

5 g zinc carbonate (wet-milled to a fine powder) was added per hour.

The resulting mixed oxided is very suitable for fixing dyes.

EXAMPLE XII

In a vessel containing an aqueous solution of 5 percent ammonium chloride, a perforated iron cathode was disposed in horizontal condition with degreased glass beads thereon. Over the cathode an iron anode was placed in horizontal position, to which a current of 20 amp. was supplied.

The liquid was kept in motion by means of a stirrer, both below and above the cathode.

In the same vessel one or more electrode systems of platinum coated titanium mesh were installed, to which a total current of 6.5 amp. was supplied. During the electrolysis were respectively added in different runs barium carbonate, zinc carbonate, magnesium carbonate and manganese carbonate in the calculated amounts. After 6 hours, it was found that ferrite had homogeneously deposited on the glass beads, which were rather magnetic after drying.

The electrolyte can also be agitated by means of a pump instead of a stirrer.

The above example was repeated using as insoluble compounds a calculated amount of a mixture of lithium carbonate, manganese carbonate and zinc carbonate.

The resulting product was after heating at 900°C strongly magnetic.

The (mixed) oxides produced as illustrated in the above examples can be oxidized or reduced further, if desired electrolytically, for example, by placing them in a cell, such as a diaphragm cell, and exposing them to the anodic or cathodic action thereof. Suitable electrolytes for this purpose are, for example, aqueous solutions of halides, sulphates, nitrates and iodium or potassium hydroxides.

In all of the examples, the intimate admixture of the oxides could be greatly stimulated by exposing the electrolytic vessel or the electrolyte, for example, to ultrasonorous vibrations during the electrolysis.

I claim:

1. A method of making intimately admixed metal oxides, comprising placing into an electrolyte a pair of electrodes the anode of which is a metal electrode the metal of which is to form one of the intimately admixed metal oxides and which metal will form a hydroxide of said metal upon electrolysis of said electrolyte, adding to the electrolyte a poorly soluble compound of at least one second metal which is to form the other of the intimately admixed metal oxides, providing in said electrolyte a source of oxygen, carrying out electrolysis of said electrolyte by means of said electrodes while agitating the electrolyte, and recovering the precipitated intimately admixed oxides of the metal of the electrode and the metal of the compound.

2. A method as claimed in claim 1 in which said step of providing a source of oxygen comprises blowing an oxygen containing gas into the electrolyte.

3. A method as claimed in claim 2 in which the step of blowing gas into the electrolyte comprises blowing the gas in at sufficient velocity to agitate the electrolyte.

4. A method as claimed in claim 1 in which the compound is a compound taken from the group consisting of carbonates, oxides, sulphides and fluorides of the metal.

5. A method as claimed in claim 1 in which the anode is a metal taken from the group consisting of iron, copper, nickel, zinc, lead and cobalt.

6. A method as claimed in claim 1 in which the electrolyte is an aqueous solution of a material taken from the group consisting of haldies, nitrates, sulphates, acetates and oxalates.

7. A method as claimed in claim 1 in which said electrolyte is an electrolyte which can be electrolyzed to produce an oxidizing agent, and said step of providing a source of oxygen comprises placing at least one further pair of electrodes in said electrolyte for electrolyzing the electrolyte to produce the oxidizing agent.

8. A method of making intimately admixed ferrites, comprising placing into an electrolyte having a pH of from 5 to 8.8 a pair of electrodes the anode of which is iron and the electrolyte being an electrolyte in which the iron from the anode will form iron hydroxide when electrolyzed with the iron anode, adding to the electrolyte a compound of at least one second metal which is to form the other of the metal oxide of the ferrite and which has a solubility in the electrolyte of less than 8 percent, providing in said electrolyte a source of oxygen, carrying out electrolysis of said electrolyte by means of said iron anode and the other electrode while agitating the electrolyte, and recovering the precipitated intimately admixed oxide of iron and the oxide of the at least one second metal as a ferrite of the two metals.

9. A method as claimed in claim 8 in which the compound is a compound taken from the group consisting of carbonates, oxides, sulphides and fluorides of the metal.

10. A method as claimed in claim 9 in which the compound is a carbonate taken from the group consisting of barium carbonate, zinc carbonate, manganese carbonate and copper carbonate.

11. A method as claimed in claim 8 in which the step of providing a source of oxygen comprises blowing an oxygen containing gas into the electrolyte.

12. A method as claimed in claim 11 in which the step of blowing gas into the electrolyte comprises blowing the gas in at sufficient velocity to agitate the electrolyte.

13. A method as claimed in claim 8 in which the pH of the electrolyte is from 6 to 6.4.

14. A method as claimed in claim 8 in which the solubility of said compound is from 0.0001 to 5 percent.

15. A method as claimed in claim 8 in which the electrolyte is an aqueous solution of a material taken from the group consisting of halides, nitrates, sulphates, acetates and oxalates.

16. A method as claimed in claim 8 in which said electrolyte is an electrolyte which can be electrolyzed to produce an oxidizing agent, and said step of providing a source of oxygen comprises placing at least one further pair of electrodes in said electrolyte for electrolyzing the electrolyte to produce the oxidizing agent.

17. A method as claimed in claim 16 in which the electrolyte includes potassium chloride, and said further pair of electrodes is operated at a current density to produce potassium hypochlorite.

18. A method as claimed in claim 8 in which said step of recovering the intimately admixed oxide of iron and the oxide of the other metal comprises heating the recovered precipitate to a temperature of from 800° to 1,100°C.

19. A method as claimed in claim 8 in which said step of recovering the intimately admixed oxide of iron and the oxide of the other metal comprises heating the recovered precipitate to a temperature of from 100° to 300°C to dry it.

20. A method as claimed in claim 8 in which the electrolyte is a 5 percent aqueous solution of potassium chloride and both electrodes are iron, the added compound is barium carbonate, and the steps of providing a source of oxygen and agitating the electrolyte comprise flowing air into the electrolyte at a rate sufficient to agitate it.

21. A method as claimed in claim 8 in which the electrolyte is a 5 percent aqueous solution of a mixture of potassium chloride and barium chloride, both electrodes are iron, the added compound is barium carbonate, and the steps of providing a source of oxygen comprises placing at least one further set of electrodes in the electrolyte and the anode of which is a platinum coated titanium electrode and the cathode of which is iron and electrolyzing the electrolyte with said further set of electrodes.

22. A method as claimed in claim 8 in which there is applied a permanent magnetic field during the electrolysis.

23. A method as claimed in claim 8 in which there is applied an alternating magnetic field during the electrolysis.

* * * * *

UNITED STATES PATENT OFFICE
CERTIFICATE OF CORRECTION

Patent No. 3,869,359            Dated May 23, 1975

Inventor(s) HENRI BERNARD BEER

It is certified that error appears in the above-identified patent and that said Letters Patent are hereby corrected as shown below:

In the Heading

[30] Foreign Application Priority Data

June 29, 1972 Great Britain 30547/72

Signed and Sealed this twenty-second Day of July 1975

[SEAL]

Attest:

RUTH C. MASON
Attesting Officer

C. MARSHALL DANN
Commissioner of Patents and Trademarks